1754X
W. W. Townsend,
Cheese Press,
Patented June 13, 1812.
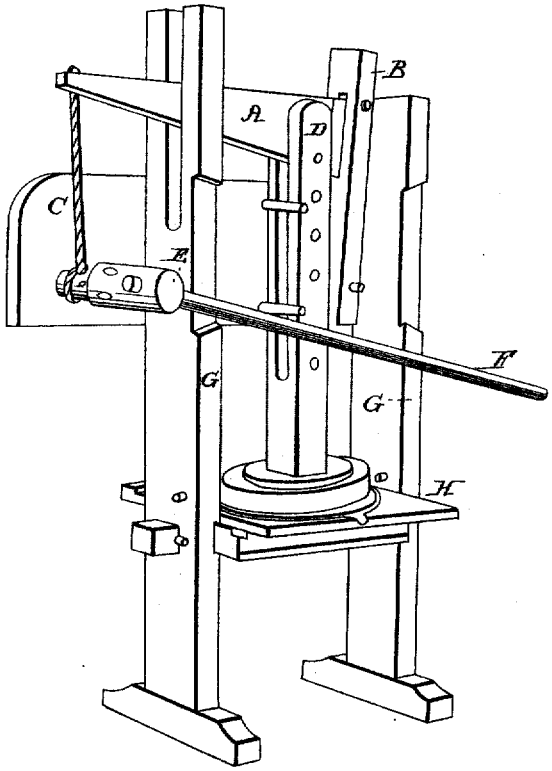
AM. PHOTO-LITHO. CO. N.Y. (OSBORNE'S PROCESS)

William W Townsend 1754X

Letters Patent

The Schedule referred to in these Letters Patent and making part of the same containing a description in the words of the said William W Townsend himself of his Cheese Press.

The advantages arising from this improvement over other machines for similar purposes, are that, a great power is obtained at a small expense as the machine is very simple in its construction and requires but little room. The power is obtained by the application of two levers connected with a roller or cylinder, one end of the first lever enters a mortice in a vertical piece called a holder, the lower end of which is secured to the frame, by a pin passing through the two side pieces of the frame and the holder, and serves as a centre for the holder to revolve or turn upon there is also a pin in the upper part of the said mortise, and a semicircle cut in the upper edge of the lever, which receives said pin, near the holder, is, a vertical slider, the upper end of which has a long chase mortise through which the lever passes, the slider is perforated at proper distances, the whole length of the mortice aforesaid, the lower end of this slider bears upon the substance to be compressed, and a pin put through one of the said holes, the most suitable height forms a fulcrum for the lever, to the other end or longest brachia of of the lever is attached a chain, rope, or other flexible substance, which is fastened to and winds round the said roller or cylinder between the sides of the frame. One end of this roller projects beyond the side of the frame, the projecting end is perforated with several holes in different directions passing through its centre, which holes receive a second lever which serves to turn the ~~second~~ Roller or cylinder and operates as a windlass, upon the rope or chain aforesaid. the longest brachia of this

1754X lever is generally reversed to the other, in which case it requires
less room to work the machine; but it may be continued in the
same line, to any length at pleasure as the lower end of this
holder is moveable upon a centre and the motion of the lever
in the holder and upon the fulcrum, is on round pins, very
little friction is produced. a pin or cleat is fixed to the up
right sides of the frame under which the cheese board slides.
when the cheese is to be turned, the board may be drawn for
ward sufficiently to turn the cheese upon the board, and these
pins or cleats serve to keep it in a horizontal position Witnesses
John Van Zandt
Wh Cochran.

William W. Townsend (623 [illegible]) (Patented June 13. 1842.)

(Drawing made)